(No Model.)
C. A. CORMAN.
TEMPERATURE REGULATOR FOR INCUBATORS.
No. 378,435. Patented Feb. 28, 1888.
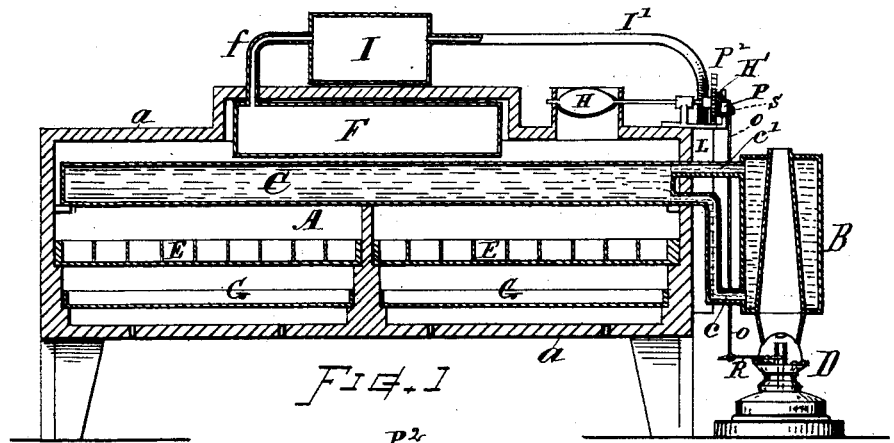
Fig. 1.
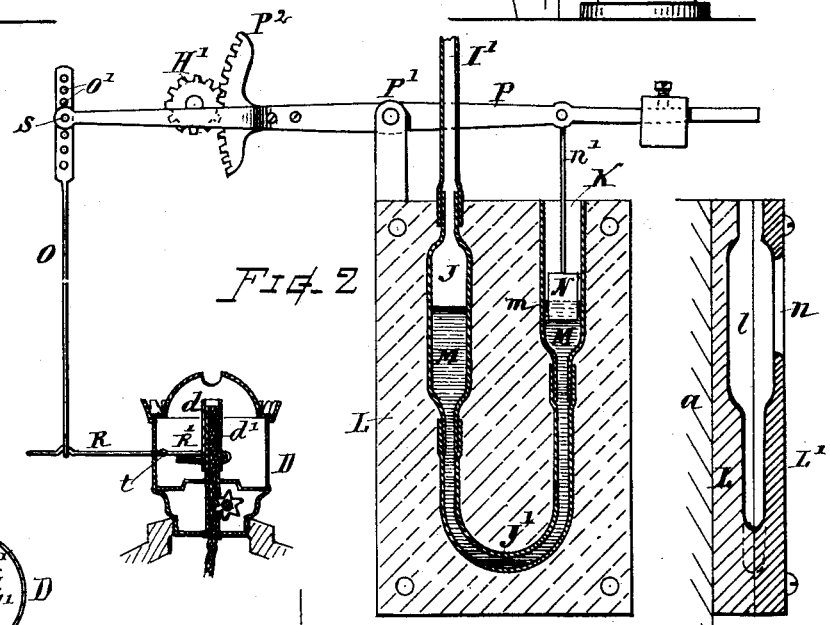
Fig. 2. Fig. 3.
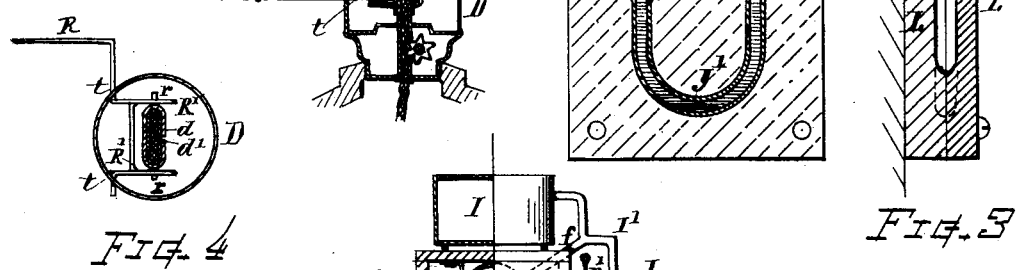
Fig. 4. Fig. 5.
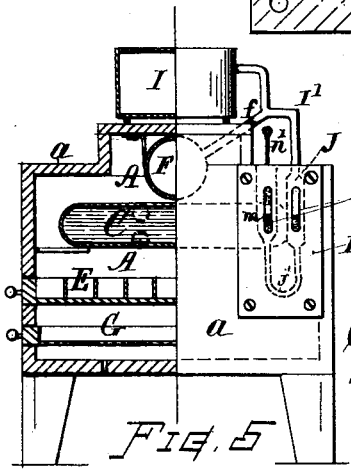
WITNESSES.
Ella P. Plenus.
J. W. Barton
INVENTOR
Charles A. Corman.
By Chas. H. Burleigh,
Attorney.

UNITED STATES PATENT OFFICE.

CHARLES A. CORMAN, OF COCHITUATE, MASSACHUSETTS.

TEMPERATURE-REGULATOR FOR INCUBATORS.

SPECIFICATION forming part of Letters Patent No. 378,435, dated February 28, 1888.

Application filed August 17, 1887. Serial No. 247,215. (No model.)

*To all whom it may concern:*

Be it known that I, CHARLES A. CORMAN, a citizen of the United States, residing at Cochituate, in the county of Middlesex and State of Massachusetts, have invented certain new and useful Improvements in a Thermostat for Incubators and Similar Purposes, of which the following, together with the accompanying drawings, is a specification sufficiently full, clear, and exact to enable persons skilled in the art to which this invention appertains to make and use the same.

The object of my present invention is to counteract or obviate the injurious effects liable to be occasioned by climatic changes or by the rising and falling of the temperature externally of the incubator-chamber, and to provide a practical and efficient apparatus for regulating the temperature of an incubator or inclosed chamber controlled partially by the degree of temperature within said chamber and partially by the degree of external temperature, the action due to the one being qualified by the action due to the other, so that the resultant effect in the regulation of the heat-producing devices will cause such an amount of heat to be generated or produced as will be just sufficient for maintaining the internal temperature of the chamber within the desired limit or at the given degree, regardless of the degree of the external temperature and of the variations or changes in the degree of such external temperature as may from time to time occur.

Another object of my invention is to afford, in combination with an incubator a pneumatically-actuated regulating mechanism provided with thermo-regulators or expansion-chambers disposed, respectively, within and without the incubator or inclosed heated chamber, both having connections or facilities for simultaneously and conjointly exerting their influence in the actuation of the regulating devices whereby the production or generation of heat is controlled.

These objects I attain by mechanism, the nature and operation of which are illustrated in the drawings and explained in the following description, the particular subject-matter claimed being hereinafter definitely specified.

In the drawings, Figure 1 is a longitudinal section of an incubator, illustrating the nature of my invention. Fig. 2 is a sectional diagram illustrating the nature of the regulating mechanism. Fig. 3 is a vertical section of the shield-board for the regulator-cups. Fig. 4 is a horizontal section of the burner, and Fig. 5 is a half transverse section and half end view of an incubator showing my invention. The heater and regulating-lever are omitted in Fig. 5.

Referring to parts, A denotes the incubator chest or chamber, which may be made as a box or wood casing, *a*, of any convenient form or size, as desired.

B indicates a generator or boiler which communicates with a reservoir or tank, C, disposed within the case, by pipes *c c'*, in a manner to give circulation of hot water for heating the chamber A. Coils of pipe may be used in place of the tank C, if preferred.

D indicates the lamp, burner, or heat-producing device, disposed beneath the boiler and regulated for the production of the required quantity of heat, as hereinafter explained.

E indicates the drawer for the eggs, which can be arranged and supported in said drawer in any well-known manner.

G indicates the evaporating-pan for containing the water whereby the moisture is imparted to the air within the chamber.

H indicates a shutter or ventilating-damper, arranged in connection with the upper part of the chamber and operated in connection with the heat-regulating apparatus.

Within the incubator or chamber A, I arrange a thermo-regulator, F, preferably consisting of a close tank or hollow cylinder of sheet metal, containing air, and having but a single outlet, to which a pipe, *f*, is connected. The surface of the cylinder is exposed to the atmosphere within the incubator-chamber A, so that the air within the cylinder F will expand and contract as the temperature of the chamber rises and falls. Outside of the incubator-chamber, and exposed to the external atmosphere, I arrange another thermo-regulator, I, also formed as a close hollow cylinder or tank of sheet metal, and containing air that is expanded and contracted accordingly as the temperature of the external atmosphere rises and falls. The pipe *f* communicates with the interior of the cylinder I, and a pipe, I', leads therefrom to a pneumatic balance that works the regulating mechanism of the heat-producers. The pipe $f$ from the thermo-regulator F may lead directly into the thermo-regulator I; or separate pipes leading from each may be joined into a pipe or air-passage common to both and leading to the pneumatic balance device, and serving as a common connection through which the fluctuations of pressure in the respective pneumatic chambers or thermo-regulators are caused to simultaneously and conjointly act upon the regulating device.

The balance device is constructed as illustrated in Fig. 2. An oblong glass bulb, J, is connected to the end of the pipe I'. Adjacent thereto is arranged a glass cup, K, open at the top and having its lower end connected with the bulb by an inverted siphon or U-shaped bend of pipe, as at J'. This latter is preferably formed of rubber or equivalent flexible tubing material about one-quarter inch caliber, while the bulb J and cup K are of glass about one inch (more or) less in caliber. The bulb J, cup K, and bend J' are preferably incased between two pieces of board, L L', (see Fig. 3,) which are provided with a cavity or recess, $l$, for their reception, and are thus confined from displacement and protected from injury. The face-board is provided with slits or openings $n\ n$ at the positions of the bulb and cup, through which to observe the operation. The boards containing the bulb, cup, and bend are secured to the incubator-case $a$ by screws, as indicated, or, if in any case more convenient, in other suitable manner supported adjacent to the lamp or heater. The bend J' is filled with mercury, M, up to the level $m$. This cuts off the air-passage from the pipe I' to the external air, so that different degrees of pneumatic pressure within the thermo-regulators F or I will cause fluctuations in the level of the mercury at $m$ in the open-topped cup K.

A float, N, is arranged in the cup K on the surface of the mercury. This float is connected by a rod, $n'$, with one arm of a swinging lever, P, fulcrumed on a suitable support at P', and having its other end connected for working the burner devices.

The burner D is provided with an outer sliding tube, $d$, that works up and down on the main wick-tube $d'$. (See Figs. 2 and 4.) This slide has projections $r$ on its sides that engage with the arms R' of a rocker wire or lever, R, fulcrumed at $t$ in the rim of the burner-frame, and whereby said slide can be freely raised and depressed as the outer arm of the lever R is operated. Said outer arm of lever R is connected with the lever P by a rod, O, having at its end a series of openings, O', either of which can be placed on the joint-stud S of the lever P, thus adjusting the apparatus for a higher or lower general action.

Connected with the lever is a gear-segment, P², that operates a pinion, H', on the shaft of the ventilator H, so that said ventilator will be opened and closed by the pneumatic regulating apparatus.

The disposition and construction of the lever and connections for moving the burner-slide or extinguisher $d$ from the float N of the pneumatic balance may be modified without departing from the spirit of my invention, since different requirements of service as to size and form may require greater or less leverage or more or less movement to be imparted by a given variation of the mercury level at $m$.

The operation of my invention is as follows: The external temperature being, say, 65° Fahrenheit, and the mechanism being adjusted for maintaining a nominal temperature in the chamber A of, say, 104° Fahrenheit, the mercury M in the pneumatic balance is then holding the flame-regulating slide at such position that the heater will warm and circulate water sufficient to give the required quantity of heat in the chamber. Now, if the temperature in the chamber A falls, the thermo-regulator F is affected, and the air therein, losing heat, becomes more condensed, reducing the pneumatic pressure on the mercury, so that it can flow back in the bend J', dropping the float N and working the levers P and R and their connections so as to move down the slide $d$ and allow more flame and increase of heat to the boiler. When the temperature of chamber A rises, the thermo-regulator F responds by expansion of its inclosed air. Greater pressure is thereby brought upon the mercury in the bulb J, causing it to flow into and rise in the cup K, lifting the float and effecting action of the slide $d$ to cut off or lessen the production of heat, as will be readily understood. Such is the action when normal external temperature is maintained. But if the external or climatic temperature rises or falls it will readily be seen that less heat in the first instance and more heat in the second instance would necessarily have to be produced to maintain the chamber at 104° Fahrenheit, owing to the effect of such climatic or surrounding temperature, on the same principle that it requires more artificial heat to warm apartments in winter than in summer. This part of the regulation is taken care of by the thermo-regulator I or externally-disposed cylinder. In this the inclosed air is affected by the external temperature, the pneumatic pressure being increased by a rise of temperature and diminished by a fall of temperature, and said pneumatic pressure, being and acting in common with that of the thermo-regulator F, modifies and qualifies the resultant action accordingly as the climatic or exterior temperature varies, effecting a greater general elevation of the level of the mercury and of the float N as the temperature rises and a general lowering of the mercury-level as the external temperature falls. By this means I avoid the liability of having the temperature of the incubator-chamber changed beyond the safe limit by sudden or severe climatic changes, such as frequently occur.

What I claim as of my invention, to be secured by Letters Patent, is—

1. In a regulating apparatus for controlling the temperature of a chamber, a pneumatic thermo-regulator disposed within said chamber and a pneumatic thermo-regulator disposed outside of the chamber, both having a common connection for simultaneous conjoint action, in combination with a balance and float for receiving and transmitting the motion induced by fluctuation of the pneumatic pressure within said indicators, substantially as set forth, whereby the action of one thermo-regulator is qualified, counteracted, or augmented by the action of the other to give a mean resultant action, due to both the external and the internal temperatures.

2. In a heat-regulating appliance for incubators, the combination of an expansion air-chamber located within the incubator-case, an auxiliary expansion air-chamber located outside the incubator-case, a pneumatically-actuated balance, and a tubular connection from said balance communicating with the interior of both of said air-chambers, substantially as and for the purpose set forth.

3. The combination, with an incubator-chamber having a heat-radiator arranged therein, of a thermo-regulating mechanism consisting of two pneumatic thermo-regulators, one within and one without the incubator-chamber, and connecting-pipes communicating therefrom for simultaneous action, with a balance and float mechanism and connections actuated by the movement of said float for controlling the heat-producing flame, substantially as set forth.

4. The combination, with the chamber A, having the heating devices C and egg-trays E, of the cylinder F, having air-pipe $f$, the cylinder I, having air-pipe I', the pneumatic liquid-balance J K, with bent pipe J', the float N, lever P, connecting-rod O, lever R, and burner-slide $d$, for the purposes set forth.

5. The combination of the ventilator H, mounted on a rotating shaft provided with the pinion H', the lever P, carrying the gear-segment P$^2$, meshing with said pinion, the incubator-case $a$, the pneumatic chambers F and I, connecting-pipe I', and the pneumatic balance device and lever-actuating float N, as and for the purposes set forth.

6. The bulb J, cup K, and connecting-bend J', containing mercury, M, in combination with the pipe I', inclosed pneumatic chamber F, and exposed pneumatic chamber I, the float N, the actuating-lever P, and burner-controlling devices, substantially as and for the purposes set forth.

Witness my hand this 8th day of August, A. D. 1887.

CHARLES A. CORMAN.

Witnesses:
CHARLES H. BURLEIGH,
GEO. T. CORMAN.